United States Patent [19]

Hunt

[11] Patent Number: 4,737,056
[45] Date of Patent: Apr. 12, 1988

[54] EXTENDABLE BRACE BAR FOR SECURING CARGO

[75] Inventor: John F. Hunt, Arlington, Wash.

[73] Assignee: Hunt-Davis, Seattle, Wash.

[21] Appl. No.: 923,878

[22] Filed: Oct. 28, 1986

[51] Int. Cl.$^4$ .......................... B60P 7/08; B61D 45/00
[52] U.S. Cl. ................................................. 410/151
[58] Field of Search ............... 410/140, 143, 144, 145, 410/146, 147, 148, 149, 150, 151, 152, 153; 238/53; 211/105.4, 123

[56] References Cited

U.S. PATENT DOCUMENTS

| | | | |
|---|---|---|---|
| 457,977 | 8/1891 | Wilkening | 211/123 |
| 891,897 | 6/1908 | Astrom | 410/151 X |
| 1,042,255 | 10/1912 | O'Gorman | 238/53 |
| 1,752,472 | 4/1930 | Whitney | 211/123 |
| 1,891,588 | 12/1932 | Claus | 410/151 |
| 1,951,660 | 3/1934 | Klaudt | 410/151 |
| 3,329,388 | 7/1967 | Barber | 410/151 X |
| 3,762,097 | 10/1973 | Gallo | 410/151 X |
| 3,880,394 | 4/1975 | Wisecarver | 410/151 |
| 4,343,578 | 8/1982 | Barnes | 410/143 X |
| 4,464,089 | 8/1984 | Allen | 410/143 X |
| 4,473,331 | 9/1984 | Wisecarver | 410/143 X |

*Primary Examiner*—Johnny D. Cherry
*Assistant Examiner*—Frank Williams
*Attorney, Agent, or Firm*—Hughes & Cassidy

[57] ABSTRACT

A brace for securing cargo inside a containing device, such as the cargo bed of a truck, includes a first cylindrical pole with mounting brackets at opposite ends of the pole for engaging the sidewalls of the container. The cargo brace is selectively adjustable along its lengthwise axis to decrease or increase its length. Furthermore, the mounting brackets are pivotally connected to the pole to permit the brace to be installed at a selected orientation to the sidewalls. In another embodiment, the aforementioned brace includes a T-connector which is mounted arond the first pole and further includes a second pole which is engaged to the T-connector and which is perpendicular to the first pole. The second pole includes a mounting bracket which engages another sidewall or floor of the container. In another embodiment, a sleeve, having flanged ends which are perpendicular to the sleeve, and a handle, is mounted about the first pole to secure the cargo in the container. Typically, pads fabricated of an appropriate elastomer are employed at the ends of the brace to prevent damage from metal-to-metal contact, and the base is surrounded with one or more sleeves of a polymeric material to prevent damage to cargo contacted by the brace.

5 Claims, 5 Drawing Sheets

EXTENDABLE BRACE BAR FOR SECURING CARGO

TECHNICAL FIELD

The present invention relates to apparatus and methods for bracing cargo in a containing device. More particularly, the present invention pertains to apparatus and methods for securing cargo in a vehicle, such as the cargo bed of a truck.

BACKGROUND OF THE INVENTION

A common problem has been the bracing of cargo in a container when the cargo does not completely fill the container. Without being properly braced, any movement of the container can cause the cargo to shift about inside the container thereby causing damage to both the cargo and container.

Often a load of cargo will include items of varying shapes and sizes. Therefore, the brace should be adjustable to effectively secure the cargo to the container regardless of the size, shape, or manner of packing these individual cargo items.

Significant problems are often encountered when transporting goods in the cargo bed of a truck. This cargo may typically include square or rectangular articles such as boxes, cylindrical articles such as barrels or drums, or relatively thin articles such as wood, mattresses, or the like. Sometimes these goods are stacked on top of each other making it difficult to effectively secure them against movement.

Various conventional bracing devices have been disclosed. For example, in U.S. Pat. No 4,343,578 by Barnes, there is disclosed a load stabilizer for a truck; the load stabilizer including a pair of telescoping poles which are held in expanded relation against the sidewalls of the truck bed by a locking assembly.

Additional load bracing devices are disclosed in U.S. Pat. No. 4,432,678 by Liebel, in which a load retainer which is extended between opposing sidewalls of a container includes screw apparatus for selectively extending the load retainer between the sidewalls; and, U.S. Pat. No. 3,880,394 by Wisecarver, in which a load bracing device includes a pole and an adjustable end foot which is threadably engaged to the pole and which utilizes an adjusting nut for varying the position of the end foot.

In Barber, U.S. Pat. No. 3,329,388 there is disclosed an adjustable brace which is positioned within a roll of material to prevent the roll from collapsing when subjected to a compressive load.

Other bracing devices include U.S. Pat. No. 3,171,627 by Tapley et al, which discloses an adjustable device for shoring walls, roofs and the like during construction or repair; and, U.S. Pat. No. 891,897 by Astrom, which discloses a trench brace for shoring vertical timber and which utilizes a threadably engaged end portion which is adjusted to vary the length of the brace.

Devices which are adjustable in a lengthwise manner to accomplish a safety function are disclosed in U.S. Pat. No. 2,263,698 by Hodgson which includes a safety bar which is placed in a transverse manner between the interior sides of an automobile to prevent the occupants from being ejected from their seats; and U.S. Pat. No. 1,891,588 by Claus which discloses a safety bar which is mounted between the sides of a window opening and to which a safety belt or harness may be attached.

Further load bracing devices for railway cars are disclosed in U.S. Pat. No. 1,840,927 by Woodruff, in which a holding device having hooks at its opposite ends, is adapted to engage the upper edges of the railway car sidewalls; and, U.S. Pat. No. 969,002 by Teachout, in which a pair of telescoping sections forming a load retainer are adjusted in a lengthwise manner by an adjusting nut to secure the load retainer to the sidewalls of the railway car.

Finally, in U.S. Pat. No. 540,594 by Meres, there is disclosed a horse stall formed by a lengthwise adjustable horizontal beam and a vertical post which is connected to the beam.

These conventional bracing devices share several defects, the most significant defect being their inability to effectively brace loads made up of cargo items of varying sizes and shapes.

SUMMARY OF THE INVENTION

The present invention pertains to a brace for securing cargo in a container device. In an exemplary embodiment, the container device is the rear cargo bed of a truck.

In a first embodiment, the brace includes a pole to which first and second mounting brackets are threadably engaged at opposite ends of the pole. The mounting brackets include vertical flanged portions having mounting pads on their outer faces which engage the sidewalls of the cargo bed when the brace is mounted in a transversed direction across the cargo bed. The brace is secured to the cargo bed, and in engagement with the cargo items, by rotating the pole so that the first and second mounting brackets extend outward from the pole and against the cargo bed sidewalls.

In a second embodiment, a T-connector is mounted to the aforementioned transverse pole by means of a first sleeve which is engaged about the outer circumference of the pole. The T-connector includes a second perpendicular sleeve which rotatably engages a second pole having at its opposite end a third mounting bracket. the second pole may be extended forward so that the third mounting bracket is secured against the forward wall of the truck, or it may be extended downward from the first pole so that the third mounting bracket is secured against the floor of the cargo bed. When in either of these positions, the pole is rotated so as to extend the third mounting bracket and secure the brace in position. When the second pole is engaged against the sides of the cargo bed, and the first pole is engaged behind the rear surface of the cargo bed, the cargo is prevented from moving in either a transverse or rearward direction in the cargo bed.

In another exemplary embodiment, a stabilizer is mounted about the first pole. The stabilizer includes a sleeve which is mounted about the first pole, and a pair of parallel vertical flanges which extend outward from the sleeve. The flanges are positioned in engagement with the cargo to prevent transverse movement of the cargo in the cargo bed. The stabilizer also includes a handle which is attached to the sleeve and to which a strap or other cargo retaining device may be attached. The stabilizer is formed in two halves, which are joined together about the pole by a strap or the like which extends around the outer circumference of the sleeve sections.

It is therefore an object of the present invention to provide apparatus and methods for securing cargo of various sizes and shapes to the inside of a containing device.

BRIEF DESCRIPTION OF THE DRAWINGS

These an other objects and advantages of the present invention will become more readily apparent upon reading the following Detailed Description and upon reference to the attached Drawings in which:

FIG. 14 is an isometric view of the stabilizer in a closed position and mounted on a bracing pole; and, FIG. 15 is a side sectional view of the stabilizer and retainer of the fourth embodiment.

While the present invention is susceptible of various modifications and alternative forms, specific embodiments thereof have been shown by way of example in the drawings and will be described herein in detail. It should be understood, however, that it is not intended to limit the invention to the particular forms disclosed, but on the contrary, the intention is to cover all modifications, equivalents and alternatives falling within the spirit and scope of the invention as expressed in the appended claims.

DETAILED DESCRIPTION

The present invention relates generally to apparatus and methods for bracing cargo which is located inside a containing device. In a number of exemplary embodiments, apparatus and methods will be described for bracing cargo contained in the cargo bed of a truck so that the cargo is prevented from shifting when the truck is moving. It should be appreciated however, that the present invention has broader applications, such as the bracing of cargo which is located in various other containing devices such as boxes, railway cars, moving vans, storage enclosures and the like.

Figures 1, 2:
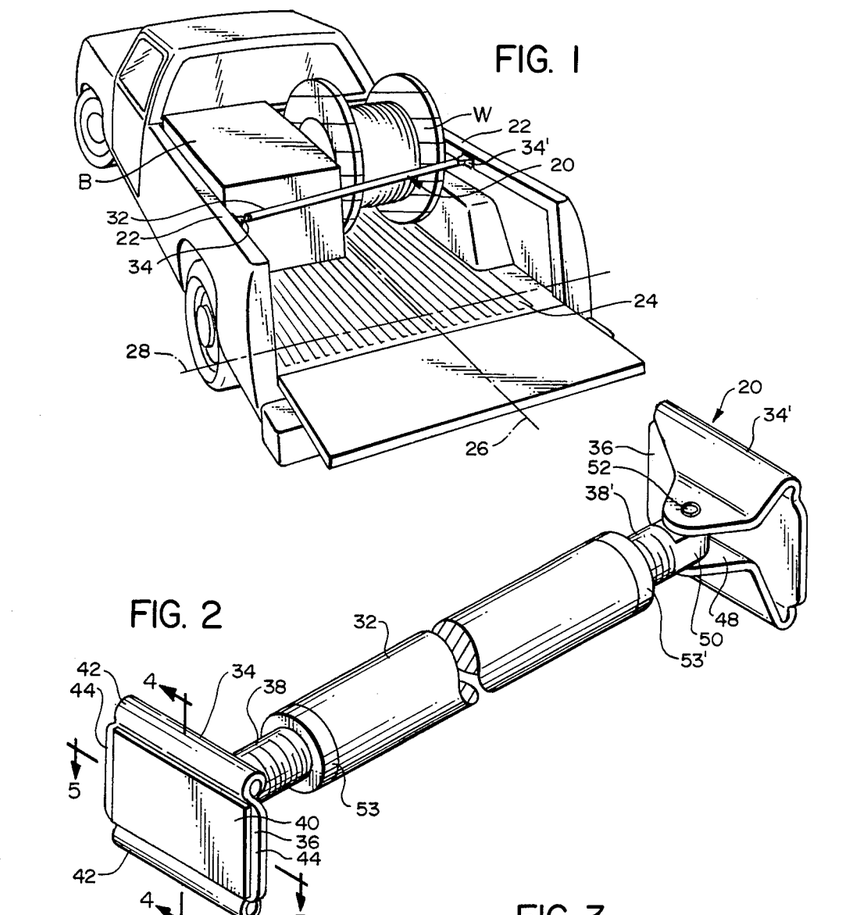
FIG. 1 is an isometric view of a first embodiment of the present invention which is utilized in an exemplary manner to brace cargo contained in the cargo bed of a truck.
FIG. 2 is a more detailed isometric view of the first embodiment of the present invention.

Referring now to FIGS. 1 and 2, there is shown a first embodiment of a cargo brace indicated at 20 and which is mounted between the inner surfaces of sidewalls 22 of a truck cargo bed having a floor 24. For purposes of orientation, the cargo bed has a lengthwise axis designated by a line identified by the number 26, and a transverse axis designated by a line identified by the number 28. Furthermore, when distinguishing between left and right ends of brace 20, a prime (') symbol will be added to the element numbers to identify those elements at the right end of the brace.

The brace 20 includes a cylindrical pole 32 and left right engaging brackets 34, 34' which are mounted on the left and right ends of the pole 32; the brackets 34, 34' being mounted to the pole 32 by means of left and right threaded shafts 38, 38'.

As shown in FIG. 1, a box B and cylindrical wire holder W are stored on the left and right portions of the floor 24 in the forward part of the cargo bed. It is obvious that any forward acceleration of the truck may cause rearward movement of the cylindrical wire holder W and the box B. The present embodiment accomplishes the task of securing the box and wire holder in the cargo bed by the transverse mounting of the brace 20 across the cargo bed at selected locations so as to abut against the rear surfaces of the box and wire holder as shown in FIG. 1. In the exemplary embodiment, the box B extends further rearward in the cargo bed than the wire holder W. In order to simultaneously engage both cargo items, the cargo brace is mounted so that its left end is mounted rearward of the right end as shown in FIG. 1.

Figure 4:
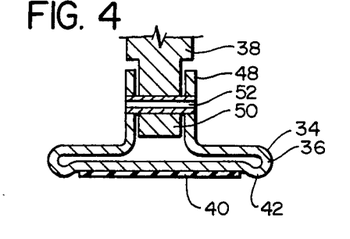
FIG. 4 is a cross-sectional view of an end mounting bracket taken substantially along the line 4—4 of FIG. 2.
Figure 5:
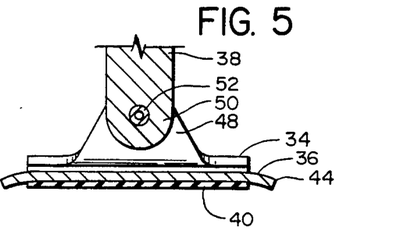
FIG. 5 is a-cross-sectional view of the end ounting bracket taken substantially along the line 5—5 of FIG. 2.

To accomplish its bracing function, each engaging bracket 34 includes a planar rectangular flange 36 which is mounted in a vertical plane. The sidewall 22 of the cargo bed is engaged by a pad 40 made of rubber or the like which is attached to the outer face of the flange 36 and which provides a frictional surface for preventing the unwanted movement of the bracket 36 relative to the sidewall 22 and also eliminates metal-to-metal contact and the damage that might cause; e.g., to painted surfaces. The pad 40 is protected by upper and lower horizontal lips 42 which are attached to the upper and lower edges of the flange 36 and which extend outward to a location which is co-planar with the outer face of the pad 40 (FIG. 4). Furthermore, flange 36 includes vertical edges 44 which curve outward to a location co-planar with the pad outer face (FIG. 5). In this manner, the lips 42 as well as the edges 44 and the pad 40 engage the sidewall 22 so that the entire expansive force of the pole 32 is not borne by the pad 40 alone. This helps prevent the pad 40 from being torn from the flange 36 due to accidental slippage of the bracket 36 along the sidewall 22.

To enable the brace 20 to be installed between sidewalls 22 so that one end is mounted rearward of the other end as shown in FIG. 1, each mounting bracket 36 includes a pair of horizontal flanged tips 48 (FIG. 2) which extend inward from the flange 36. The flange tips 48 engage the outer end 50 of the shaft 38, and a pin 52 extends vertically through the flanged tips 48 and shaft 38 to permit pivotal movement of the bracket 36 about a vertical axis and through an arc of about 270°. In this manner, the brace is mounted at the desired angle in the cargo bed. In particular with reference to FIG. 1, the left mounting bracket 34 is positioned rearward of the right mounting bracket 34 so that pole 32 simultaneously engages the rear surfaces of the box and wire holder (FIG. 1). This is accomplished by the pivoting of the mounting brackets 36 about the fastener pins 52.

Figure 3:
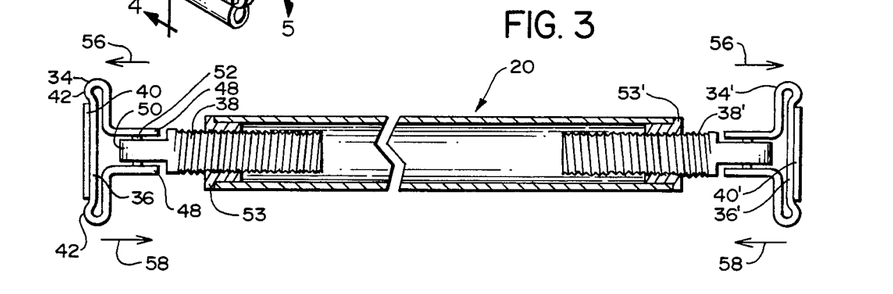
FIG. 3 is a side view depicting the cargo brace of the first embodiment including partial section views of both ends of the cargo brace.

Mounting of the brace 20 between the sidewalls 22 is further accomplished by selectively varying the distance between the left and right mounting brackets 36. More specifically, as shown in FIG. 3, nuts 53 and 53' are press fitted into the opposite ends of pole 32 which is a hollow tube as FIG. 3 makes apparent. The left and right shafts 38, 38' are threaded through nuts 53 and 53' for axial movement in a first outer direction designated by an arrow identified by the number 56, and a second inner direction designated by an arrow identified by the number 58. So that both mounting brackets 36 move outwardly together as well as inwardly together, the left nut 53 and shaft 38 are oppositely threaded from the right nut 53' and right shaft 38'. For example, looking in a left to right direction in FIG. 2, and assuming that nut 53 and left shaft 38 have left-hand threads and the right nut 53' and right shaft 38' have right-hand threads, when the pole 32 is rotated in a clockwise direction, the shafts 38, 38' move inward toward pole 32.

Shafts 38 and 38' can be made of any desired length deemed necessary for a particular application of the invention, essentially the only limitation being that the two shafts cannot be retracted beyond the point where the two juxtaposed ends of the shafts would meet.

When mounting the brace to the sidewalls 22, the brace is typically set on the cargo bed floor between the sidewalls 22 and the pole 32 is rotated in the selected direction so that the brackets 34 are extended or retracted to locations approximately even with the sidewalls 22. Then the brace is positioned so that the mounting brackets 34 engage the sidewalls 22, and the pole 32 is further rotated in the desired direction to outwardly extend the brackets 34. An outward axial force is exerted against the sidewalls 22 thereby securing the brace 20 in position. It can be appreciated that in Applicant's invention, the mounting and securing of the brace 20 to the sidewalls 22 is accomplished by the rotation of the pole 32, rather than by individual adjustment of the mounting brackets 36, thereby facilitating the installation and removal of the brace.

Figures 6, 7:
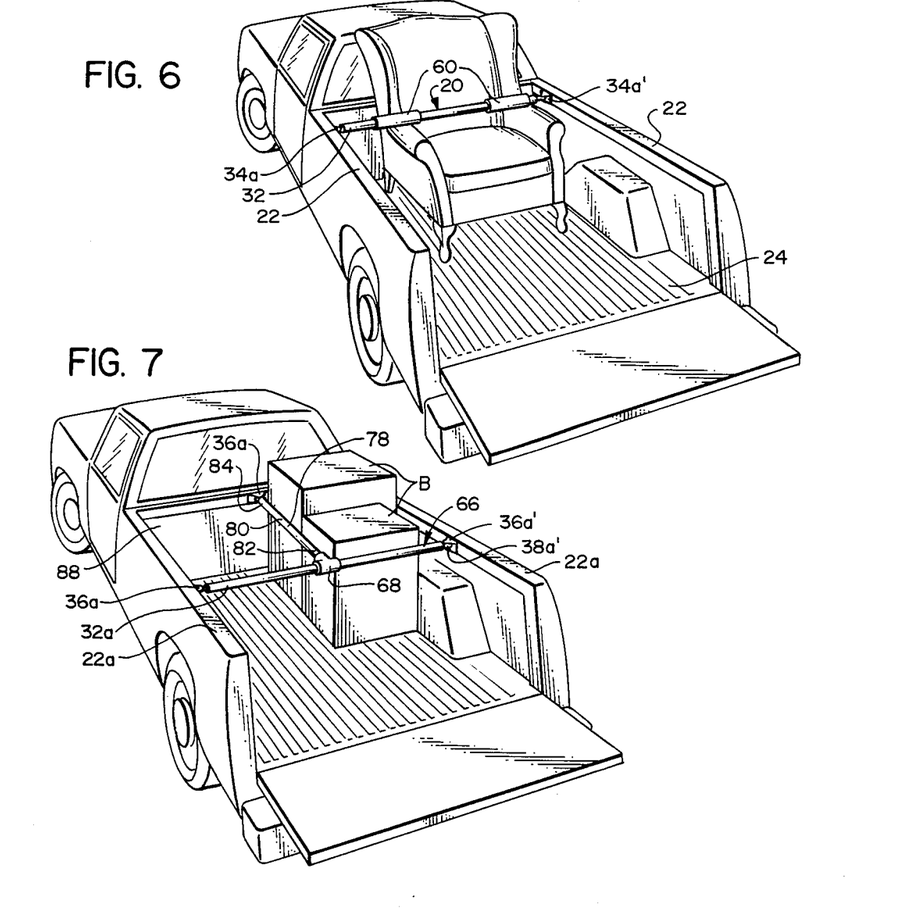
FIG. 6 is an isometric view of a second embodiment of the present invention which is used in an exemplary manner to secure cargo in the cargo bed of a truck.
FIG. 7 is an isometric view of a third exemplary embodiment of the present invention which is used in an exemplary manner to secure cargo to the cargo bed of a truck.

In order to secure somewhat fragile or delicate cargo in the cargo bed, one or more resilient sleeves 60 are mounted about the pole 32 as shown in FIG. 6. The sleeves 60 act as cushioning devices between the pole 20, which is typically made of a hard metal or alloy, and the cargo.

Figures 8, 9:
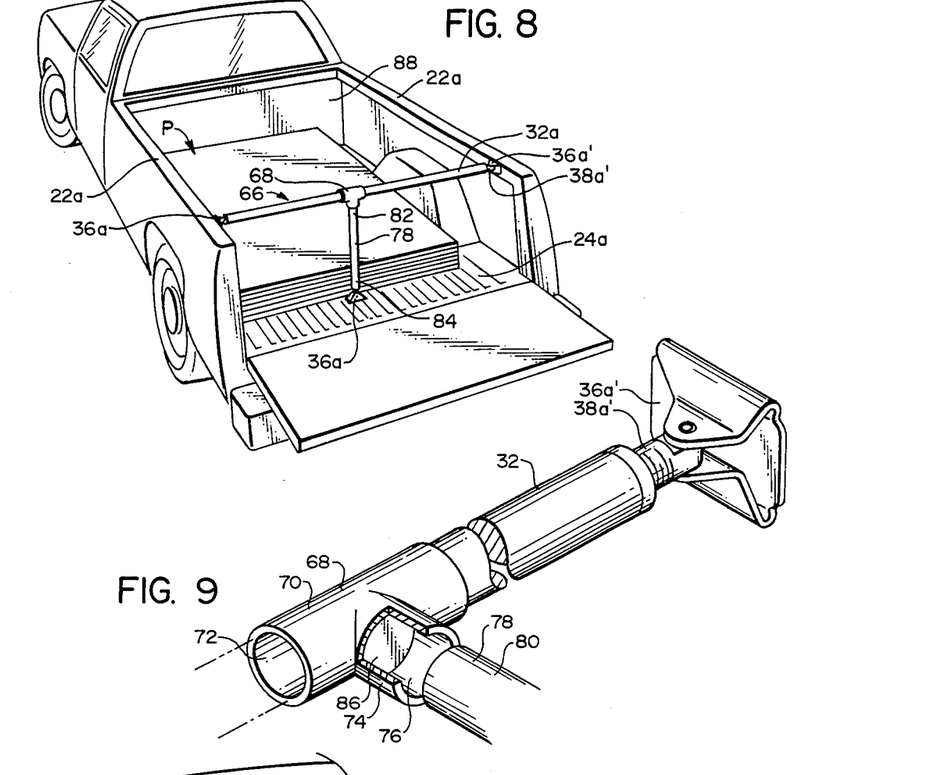
FIG. 8 is another isometric view of the third embodiment which is utilized in a manner different from that shown in FIG. 7 to secure cargo in the rear cargo bed of a truck.
FIG. 9 is an isometric view of a T-connector portion of the third embodiment.

In a second exemplary embodiment shown in FIGS. 7 through 9, like elements described in the first embodiment are designated by like numerals with the suffix "a" attached. In FIG. 7 there is shown a brace indicated at 66 including a pole 32a, left and right mounting brackets 36a which are connected to the pole 32a by left and right shafts 38a. The pole 32a, brackets 36a and shafts 38a operate in the manner described in the first embodiment. In order to provide a brace having a T-like configuration, a connector 68 is mounted about the main pole 32a. As shown more clearly in FIG. 9, the connector 68 includes a first sleeve 70 which has a left opening 72 and a right opening (not shown), and which is mounted about the main hole 32a. The connector 68 further includes a second sleeve 74 having a passageway 76 for engaging a second brace portion 78 therein. More specifically, the second sleeve 74 extends from the first sleeve 70 in a manner perpendicular to the lengthwise axis of the sleeve 70. To complete the T-brace 66, the brace portion 78 includes a pole 80 having a first end 82 which is rotatably engaged inside the passageway 76, and a second end 84 to which another mounting bracket 36a is connected by means of a threaded shaft 38a in the manner described in the first embodiment. Rotatable engagement of the pole end 84 in the T sleeve 74 is accomplished by providing the passageway 76 with a slightly larger diameter than the pole 80. A circular flange 86 is located at the inner end of passageway 76 to engage the end 82 of the pole 80.

Selective positioning of the brace 78 is accomplished by mounting the sleeve 70 on the main pole 32a for (i) slidable axial movement on the main pole 32a, as well as (ii) rotatable movement about the main pole 32a. In an exemplary cargo securing function, the main pole 32a is mounted transversely between the sidewalls 22a, and the brace portion 78 extends in a lengthwise direction and is engaged between the cargo front wall 88 and the connector 68. This is accomplished by inserting the brace 78 within the connector passageway 76 and extending the mounting bracket 36a until it engages the front wall. Then the pole 80 of the brace 78 is rotated to displace the mounting bracket 36a in a further forward direction to secure the brace 78 to the front wall. The position of the connector 68 may be further secured on the main pole 32a by a set screw (not shown) mounted in the sleeve 70 and which is rotated into engagement with the main pole 32a. As can be seen in FIG. 7, this embodiment is particularly useful for bracing cargo in both the lengthwise as well as the transverse direction in the cargo bed.

In another exemplary illustration of the application of the brace assemly 66, there is shown in FIG. 8 the brace portion 78 extending downward from the connector 68 so that the mounting bracket 36a of the brace 78 engages the floor of the cargo bed. This is accomplished by simply rotating the connector 66 until the sleeve 74 and brace portion 78 extend downward toward the floor 24a. In this manner, the brace 66 acts as a retainer for numerous cargo items such as the stack of plywood P, shown in FIG. 8, which is made up of pieces too numerous to be secured by the single transverse extending brace 20 of the first embodiment.

Figure 10:
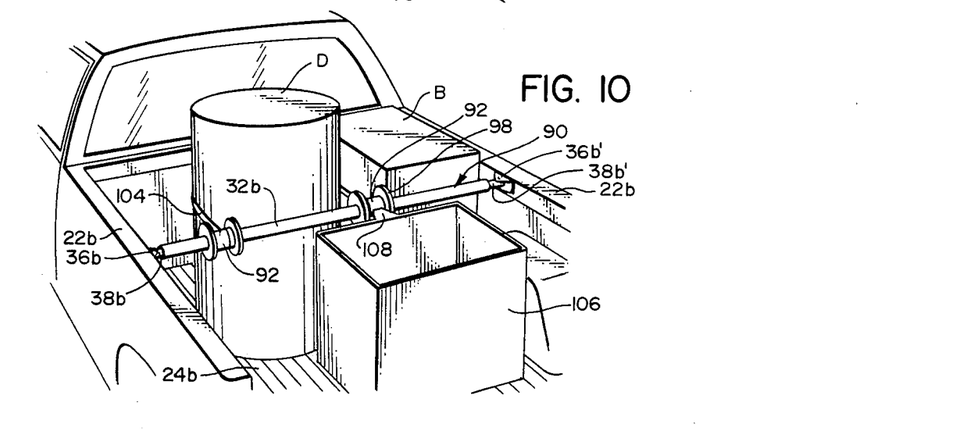
FIG. 10 is an isometric view of a fourth embodiment of the present invention which is used in various exemplary manners to secure cargo in the rear cargo bed of a truck.
Figures 11, 12:
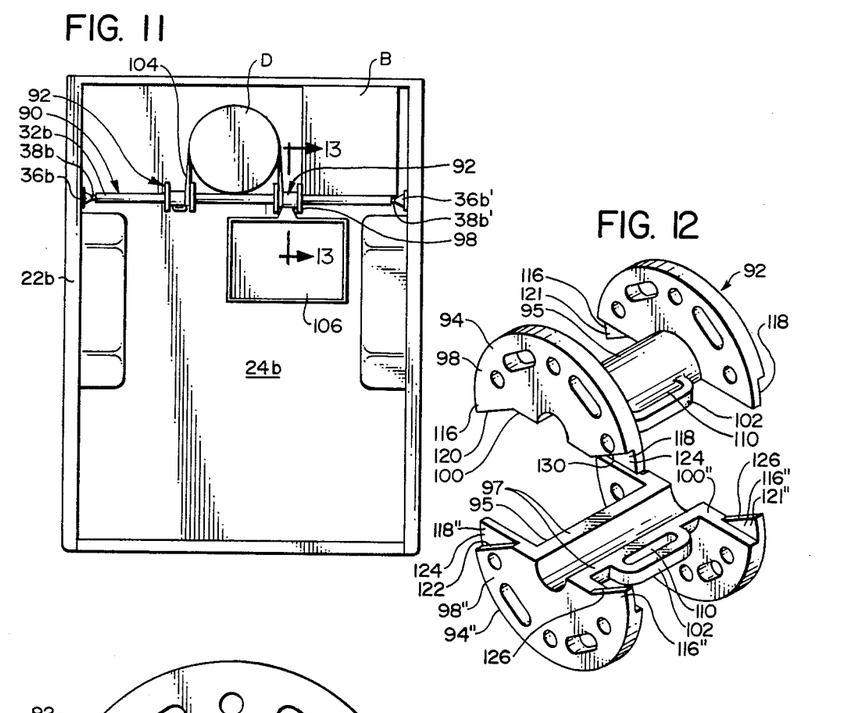
FIG. 11 is a top plan view of the fourth embodiment shown in FIG. 10.
FIG. 12 is an isometric view of a stabilizer portion of the fourth embodiment where the stabilizer is shown in an open position.
Figure 13:
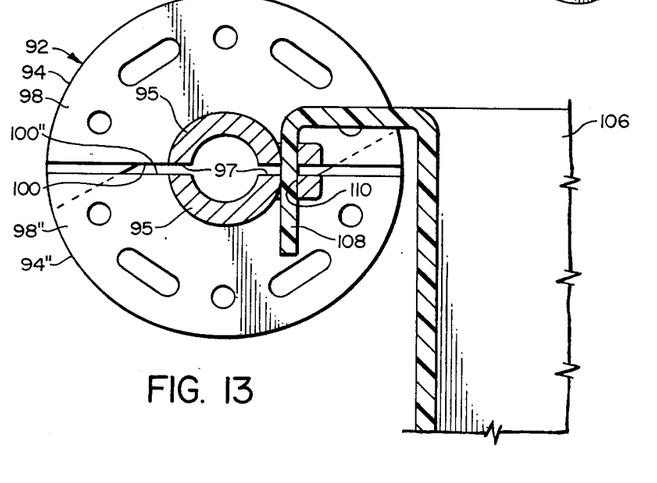
FIG. 13 is a side sectional view of the stabilizer of the fourth embodiment, taken along line 13—13 of FIG. 11.
Figures 14, 15:
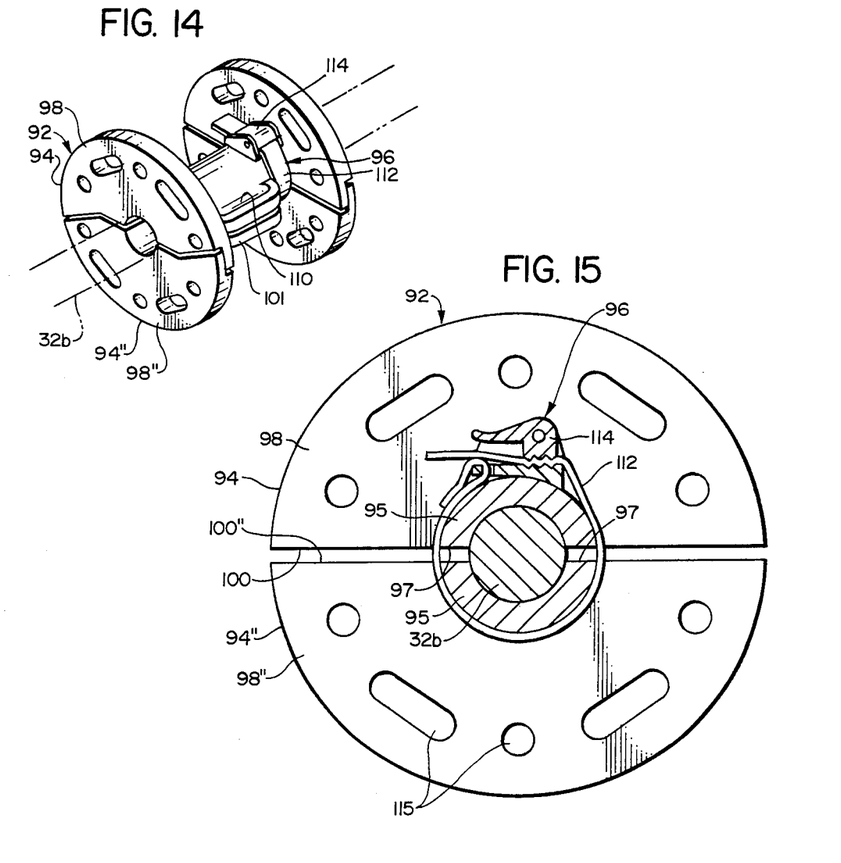

In a third exemplary embodiment shown in FIGS. 10 through 15, the elements described in the previous two embodiments are designated by like numerals with the suffix "b" attached. There is shown in FIGS. 10 and 11 a brace indicated at 90 including a pole 32b which extends transversely between the cargo bed sidewalls 22b. Left and right mounting brackets 36b, 36b' engage the sidewalls 22b, and are connected to the left and right ends of the pole 32b by threaded shafts 38b, 38b' in a manner described in the first embodiment. A cargo bracing function is also accomplished by one or more stabilizers 92 which are preferably made out of thermoplastic material such as DuPont Zytel BK-10A or the like, and which are mounted about the pole 32b at selected transverse locations. As shown more clearly in FIG. 12, the stabilizer 92 includes similar upper and lower sections 94, 94", respectively, and which are joined together in a closed position about the pole 32b as shown in FIGS. 14 and 15 by a retainer assembly indicted at 96. More particularly, each stabilizer section 94 includes a horizontal semi-circular sleeve portion 95 (FIG. 12) which includes a pair of laterally extending edges 97. In addition, mounted to the left and right ends of the sleeve portion 95 are left and right vertical semi-circular flanges 98, 98" each of which has a flat horizontal edge 100 which is located co-planar with the sleeve edges 97; the flanges 100 being generally perpendicular to a lengthwise axis of the sleeve portion 95.

The cargo bracing function is accomplished by the pole 32b in combination with flanges 98 when the stabilizer sections 94 are joined about the pole 32b. More specifically, the stabilizer sections 94 are joined so that the edges 97 of the upper sleeve 94 are proximately located to, but do not engage, the edges 97 of the lower sleeve 94"; and the edges 100 of the upper flange 98 are proximately located but do not engage the edges 100 of the lower flanges 98". This is accomplished by the fact that the diameter of the sleeve formed by the mating engagement of sleeve portions 95 is less than the diameter of the pole 32b. Since the upper and lower retainer sections 94 do not engage each other when mounted about the pole 32b, it allows the sleeve portions 95 to compressively engage the pole 32b when secured by the retainer assembly 96.

With the stabilizer 92 engaged on the pole 32b, the flanges 98 extend in a vertical plane upward and downward as well as forward and rearward of the pole 32b. By placing the retainer 92 at selected locations on the pole 32b where the flanges engage the cargo as shown in FIGS. 10 and 11, e.g. a side of a box B being engaged by the flange 98, the cargo is secured from movement in a transverse direction by the flanges 98, as, well as in a lengthwith direction by the pole 32b and the forward wall of the cargo bed.

A further bracing function is provided by a handle 101 (FIG. 14) which is formed by U-shaped handle portions 102 (FIG. 12) which are attached to the outer surfaces of the sleeve portions 95 in a manner parallel to the lengthwise axis of the sleeve portions. The handle portions 102 serve several functions, two of which are shown in FIGS. 10 and 11. In a first exemplary function, a pair of retainers 92 are mounted about the pole 32b at either side of an upstanding drum D. A strap 104 is fastened around the drum and to the handles 101 of the retainers 92 to prevent forward as well as transverse movement of the drum. The drum is prevented from moving in a rearward direction by the mounting pole 32b.

In another exemplary use, a carton 106 having an inverted U-shaped tongue 108 (FIGS. 13 and 14) is supported on the cargo floor so that the tongue 108 extends vertically through a slot 110 formed by the handle 100. The tongue 108 is secured to the side of the carton 106 by rivets (not shown) or the like.

The securing of the upper and lower retainer sections 94 together about the pole 32b is accomplished in an exemplary manner by the retainer assembly 96 which includes a strap 112 (FIGS. 14 and 15) and a conventional clamp 114. One end of the strap 112 is attached to the clamp 114, the strap is wrapped around the sleeve portions 95, and the other end of the strap is releasably secured by the serrated lever of the clamp 114.

As shown in FIG. 15, there are a number of circular and race track shaped holes 115 which extend through the flanges 98. The holes 115 provide for the securing of additional straps, rope, wire, or the like for bracing additional cargo in the cargo bed.

Lateral movement of the upper retainer portion 94 relative to the lower retainer portion 94" is prevented by locking tabs 116 (FIG. 12) which extend vertically from the flange edges 100, as well as by complementary shaped locking recesses 118 which extend below the flange edges 100. More specifically, the upper tabs 116 extend downward below the edges 100 of the upper flanges 98, while the lower tabs 116" extend upward above the edges 100" of the lower flanges. Each upper tab 116 includes an edge surface 120 which begins at a location level with the upper edge 100 and extends downward and outward and terminates at the outer semi-circular edge of the flange. Each upper tab 116 is further formed by a vertical wall 121 which extends between the surface 120 and the edge 100.

On the lower flanges at locations opposite the upper tabs 116, are the recesses 118, each of which has an edge surface 122 which begins level with the edge 100" and descends downward and outward to the semi-circular edge of the flange. Extending between the surface 122 and the upper edge 100 is a wall 124.

Similarly, each lower tab 116 includes an edge surface 126 which begins at a location level with the lower edge 100" and extends upward and outward and terminates at the outer semi-circular edge of the flange. Each lower tab 116" is further formed by a vertical wall 121" which extends between the surface 126 and the edge 100". On the upper flanges opposite from the lower tabs 116", are the upper recesses 118, each of which has an edge surface 130 which begins level with the edge 100 and descends upward and outward to the semi-circular edge of the flange. A wall 124 extends between surface 130 and the edge 100.

When the upper and lower retainer sections 94 are joined, the opposing tab surfaces and recess surfaces do not engage, as shown in FIG. 14. However, the upper and lower retainer sections are secured against transverse movement relative to each other by the opposing walls of the tabs and tab recesses; the tab walls 121 being located axially outboard of the recess walls 124.

What is claimed is:

1. A load stabilizing and bracing apparatus capable of being used within the cargo bed of pickup trucks and the like of the type having a floor, vertically upstanding, parallel, spaced apart first and second sidewalls and a third transverse endwall at the forward end of the cargo bed to secure differently shaped cargo items against forward and rearward movement by contacting the cargo items at spaced points along a line extending acutely to the spaced apart first and second sidewalls, said apparatus comprising, in combination:

(a) a first elongate tubular pole-like bracing member having a first end, a second end and a lengthwise axis extending between said first and second ends, said first and second ends of said tubular pole-like bracing member including internally threaded female end portions with said internally threaded portion at said first end of said bracing member having an internal left-hand threaded portion and said internally threaded portion at said second end of said bracing member having an internal right-hand threaded portion;

(b) first engaging means for frictionally engaging the first sidewall of the cargo bed, said first engaging means including a first vertically oriented mounting flange having an inner face and an outer face, an outwardly facing resilient mounting pad secured to said outer face of said first flange for engagement with the first sidewall of the cargo bed with sufficient frictional force to prevent relative movement of said bracing apparatus and the cargo bed when said tubular pole-like bracing member is mounted along the line extending acutely to the spaced sidewalls to secure the cargo items, and a pair of vertically spaced, horizontally extending, inwardly directed flange tips integral with and extending inward from said inner face of said first vertically oriented mounting flange;

(c) first connecting means for rotatably connecting said first engaging means to said first end of said tubular pole-like bracing member, said first connecting means including a first externally threaded male shaft adapted to be threadably engaged with said internal left-hand threaded female portion at said first end of sid tubular pole-like bracing member, said first shaft having an outwardly extending end portion adapted to be received within said pair of vertically spaced, horizontally extending, inwardly directed flange tips mounted on said first mounting flange on said first engaging means, and means for pivotally securing said horizontally extending, inwardly directed flange tips to said outwardly extending end of said first externally threaded shaft for permitting pivotal movement of said first engaging means relative to said first shaft;

(d) second engaging means for frictionally engaging the second sidewall of the cargo bed, said second engaging means including a second vertically oriented mounting flange having an inner face and an outer face, an outwardly facing resilient mounting pad secured to said outer face of said second flange for engagement with the second sidewall of the cargo bed with sufficient frictional force to prevent relative movement of said bracing apparatus and the cargo bed when said tubular pole-like bracing member is mounted along the line extending acutely to the spaced sidewalls to secure the cargo items, and a pair of vertically spaced, horizontally extending, inwardly directed flange tips integral with and extending inward from said inner face of said second vertically oriented mounting flange; and (e) second connecting means for rotatably connecting said second engaging means to said second end of said tubular pole-like bracing member, said second connecting means including a second externally threaded male shaft adapted to be threadedly engaged with said threaded female portion at said second end of said tubular pole-like bracing member, said second shaft having an outwardly extending end portion adapted to be received within said pair of vertically spaced, horizontally extending, inwardly directed flange tips mounted on said second mounting flange on said second engaging means, and means for pivotally securing said vertically spaced, horizontally extending, inwardly directed flange tips to said outwardly extending end of said second externally threaded shaft for permitting pivotal movement of said second engaging means relative to said second shaft;

whereby (i) when said load stabilizing and bracing apparatus is positioned along the acute line between the opposed first and second upstanding, spaced apart, parallel sidewalls of the cargo bed with said first and second engaging means in frictional engagement with the inner surfaces of respective different ones of the first and second sidewalls; and (ii) said tubular pole-like bracing member is rotated in a first direction to cause simultaneous outward axial extension of said first and second shafts relative to said bracing member, said load stabilizing and bracing apparatus is axially elongated and is securely clamped between the first and second sidewalls of the cargo bed as a result of pivotal movement of said tubular pole-like bracing member relative to said first and second threaded shafts so as to securely clamp cargo positioned in the cargo bed between said load stabilizing and bracing apparatus and at least one of the first and second sidewalls of the third transverse endwall of the bed by engaging the cargo items at spaced points along the acute line; and (iii) when said tubular pole-like bracing member is rotated in the opposite direction to cause simultaneous inward axial movement of said first and second shafts relative to said bracing member, said load stabilizing and bracing apparatus is axially shortened and is released from frictional engagement with the first and second sidewalls of the cargo bed.

2. A load stabilizing and bracing apparatus as set forth in claim 1 wherein said first externally threaded shaft has an outer end portion which is pivotally connected to said first engaging means and an inner end male portion having left-hand threads which engage a complimentary female threaded portion at said first end of said elongated tubular pole-like bracing member; and, said second externally threaded shaft has an outer end portion which is pivotally connected to said second engaging means and an inner end male portion having right-hand threads which engage a complimentary female threaded portion at said second end of said elongated tubular pole-like bracing member.

3. A load stabilizing and bracing apparatus as set forth in claim 1 wherein said means for pivotally securing said horizontally extending, inwardly directing flange tips on said first and second vertically oriented mounting flange to said outwardly extending end portions of respective different ones of said first and second threaded shafts, comprises a fastener pin extending vertically through said pairs of vertically spaced flange tips and respective ones of said first and second threaded shafts to permit pivotal movement of said first and second engaging means about their respective vertical axes.

4. A load stabilizing and bracing apparatus as set forth in claim 1 wherein said first and second vertically oriented mounting flanges on respective ones of said first and second engaging means include first and second lips which extend outwardly therefrom so as to at least partially enclose the edges of said resilient mounting pads so as to protect the same.

5. A load stabilizing and bracing apparatus as set forth in claim 1 further including a resilient sleeve which encloses at least a portion of said elongated tubular pole-like bracing member for engagement with cargo loaded in the cargo bhed so as to prevent damage to the cargo.

* * * * *